United States Patent [19]
Blankers

[11] Patent Number: 6,028,397
[45] Date of Patent: *Feb. 22, 2000

[54] BUCK CONVERTER SWITCHING SCHEME

[75] Inventor: Hendrik J. Blankers, Eindhoven, Netherlands

[73] Assignee: U.S. Philips Corporation, New York, N.Y.

[ * ] Notice: This patent is subject to a terminal disclaimer.

[21] Appl. No.: 08/726,710

[22] Filed: Oct. 7, 1996

[30] Foreign Application Priority Data

Oct. 9, 1995 [EP] European Pat. Off. .............. 95202699

[51] Int. Cl.$^7$ .................................................. H05B 41/36
[52] U.S. Cl. .................... 315/209 R; 315/224; 315/307; 315/DIG. 7
[58] Field of Search ................................ 315/307, 209 R, 315/224, DIG. 5, DIG. 7; 363/15, 18, 131; 323/205, 207, 209, 206, 282, 284, 285, 290

[56] References Cited

U.S. PATENT DOCUMENTS

| | | | |
|---|---|---|---|
| 3,931,567 | 1/1976 | Kostecki | 323/9 |
| 3,969,652 | 7/1976 | Herzog | 315/224 |
| 4,258,309 | 3/1981 | Ohaska et al. | 323/28 |
| 5,068,572 | 11/1991 | Blankers | 315/209 R |
| 5,235,255 | 8/1993 | Blom | 315/224 |

*Primary Examiner*—Arnold Kinkead
*Attorney, Agent, or Firm*—Bernard Franzblau; Edward Blocker

[57] ABSTRACT

A circuit arrangement for igniting and operating a high intensity discharge lamp including a Buck converter. The Buck converter includes a switch, a rectifier and an inductor having primary and secondary windings. The secondary winding is part of an integrator for controlling the non-conductive state of the switch. A detector responsive to the flow of current through the rectifier produces a signal supplied to the integrator output during the non-conductive state of the switch. The integrator output remains proportional to the flow of current through the inductor regardless of the state of the switch. Consequently, the time duration that the switch is in its non-conductive state can be limited while maintaining the circuit arrangement in a reliable non-self oscillatory mode of operation.

11 Claims, 1 Drawing Sheet

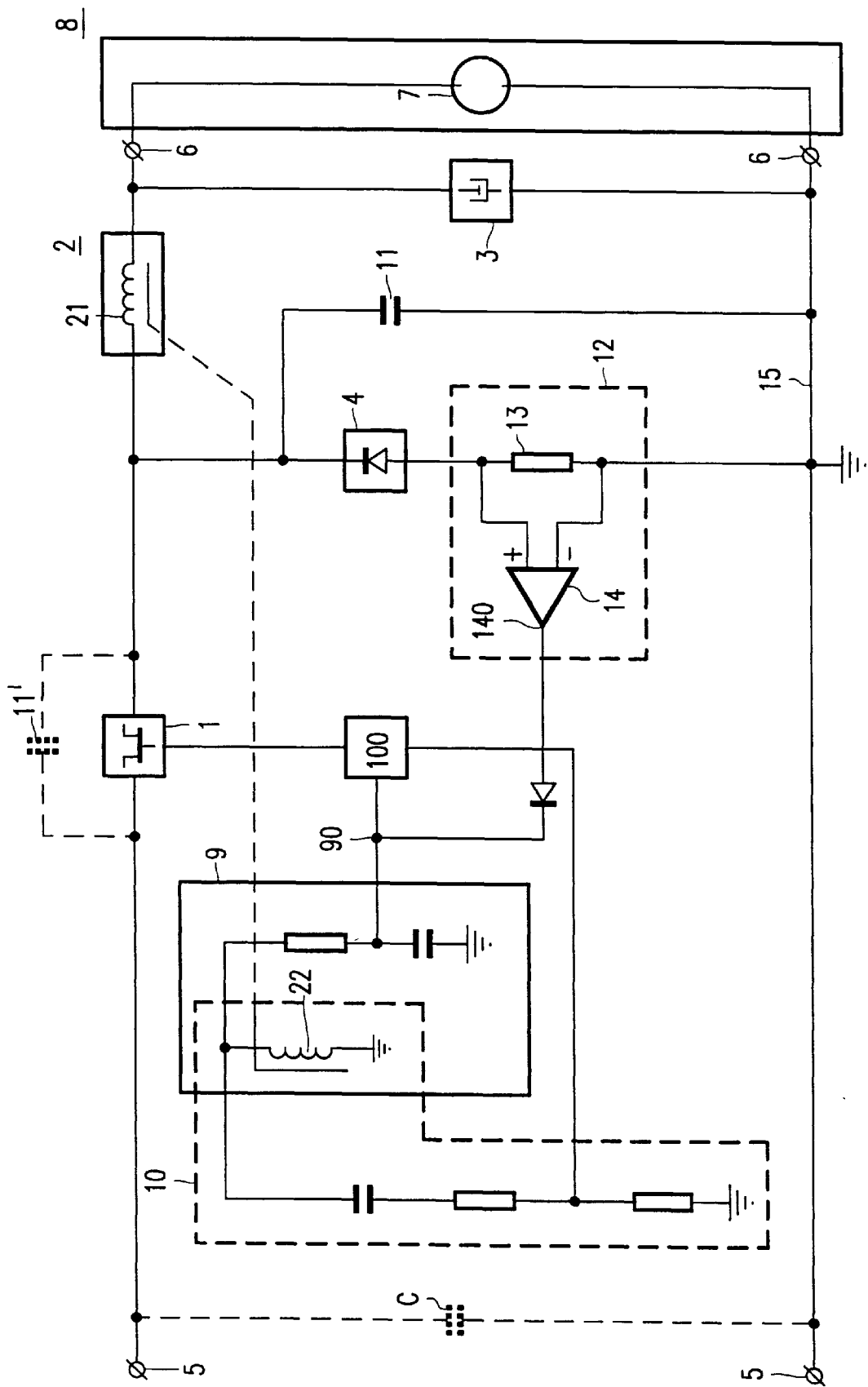

BUCK CONVERTER SWITCHING SCHEME

BACKGROUND OF THE INVENTION

The invention relates to a circuit arrangement for igniting and operating a high-pressure discharge lamp, and more particularly to a switching scheme for a Buck converter.

A circuit arrangement of the kind mentioned in the opening paragraph is known from European Patent Application EP-A-0 401 931 whose U.S. equivalent is U.S. Pat. No. 5,068,572. The known circuit arrangement is highly suitable for igniting and operating a high-pressure discharge lamp which forms part of a projection TV installation.

The type of switch mode power supply here referred to as Buck converter is also known under other designations such as downconverter, step-down converter, inductor-coupled step-down converter, direct-down converter.

Although in the Buck converter the input terminals and output terminals are usually directly electrically connected, the circuit can be provided with an electrical separation between input and output terminals, for example, in the form of a transformer.

The Buck converter operates in a self-oscillatory mode which is characterized by initiating the switching of switch from a non-conducting state to a conducting state when current through an inductor is zero.

The circuit arrangement supplies substantially constant power to the connected lamp over a comparatively wide current and voltage range so that a very constant luminous flux is generated by the lamp. The self-oscillatory mode is characterized by low switching losses in the periodic switching of the switch, especially in the current-voltage range where lamp operation is stable. Preferably, the downconverter is so dimensioned that switching from the non-conducting to the conducting state takes place with a frequency above the limit of human hearing during stable lamp operation. At such frequency the dimensions of the inductive means can remain comparatively small.

In turning the switch off, a comparison is made between a separately set control signal and a signal prevalent at an output of the integration network and proportional to the value of the current through the inductor. The moment the signal at the output of the integration network becomes equal to the separately set control signal, the switch is switched from the conducting to the non-conducting state.

The integration network comprises capacitive means. The voltage across the capacitive means is proportional to the value of the current through the inductor. Although a controlled current source of comparatively simple construction is realized with the known circuit arrangement, in which the power dissipated by the load (the lamp) can be controlled, the known circuit arrangement has a number of disadvantages.

Under certain conditions, the frequency at which the switch is switched can be relatively low and within the range of human hearing leading to noise pollution. Such noise pollution can be lessened by limiting the duration of the switch's non conductive state. By limiting the duration of the non-conductive state, the Buck converter can operate in a non-self-oscillatory mode during which a continuous current will flow through the inductor It was found, however, that the known circuit is only capable of reliable operation in the self-oscillatory mode, which accordingly represents a disadvantage.

SUMMARY OF THE INVENTION

Detection of the current flowing through the rectifier premits reliable operation other of the circuit arrangement in the non-self-oscillating mode. In particular, a signal may advantageously be generated by the detector for the supply of the integration network during the period of non-conductance of the switch. The signal at the output of the integration network may thus remain proportional to the value of the current through the inductor by a simple but effective method. The signal at the output of the integration network corresponds to the value of the current through the inductor at the moment at which the switching means become conducting. Consequently, generation of the switch-off signal for rendering the switching means non-conducting can be propertly timed wherein the switch-off signal proportional to the value of the current through the inductor. Advantageously, the detector is connected between the rectifier and a direct electrical connection present between one of the input terminals and one of the output terminals. This is true in particular when the detector comprise an ohmic impedance. On the one hand, a very simple and reliable detection of the value of the current through the rectifier is realized. On the other hand, the signal generated by the detector is independent of the voltage supplied by the supply source. In addition, current flows through the detector only when the rectifier is conducting. The circuit arrangement also counteracts a lamp circuit connected to the connection terminals serving as a source of radio interference.

Preferably, the ohmic impedance is shunted by an operational amplifier of which an output is connected to the output of the integration network, so that a signal proportional to the value of the current through the inductor is present at all times at the output of the integration network.

BRIEF DESCRIPTION OF DRAWING

Aspects of the invention described above and further aspects will be described in more detail below with reference to a drawing of an embodiment.

The drawing shows a diagram of a circuit arrangement for igniting and operating a high-pressure discharge lamp includes a switch 1, an inductor 2 and a rectifier 4 which together form a Buck converter. The converter, which also includes a buffer capacitor 3, is connected to a pair input terminals 5 for connection to a supply source (not shown) and to a pair of output terminals 6 for connection to circuitry 8 for supplying lamp 7 with a current through periodic switching of switch alternately into conducting and non-conducting states.

Inductor 2 includes a primary winding 21 and a secondary winding 22, the latter of which forms part of integration network 9. An output 90 of network 9 generates a signal (i.e. "switch-off" signal) for turning off switch 1.

Secondary winding 22 also forms part of a voltage divider circuit 10 for generating a signal (i.e. "switch-on" signal) for turning in switch 1.

A direct electrical connection 15 is present between one of the input terminals 5 and one of the output terminals 6. An ohmic impedance 13 is connected between connection 15 and the rectifier means 4. Impedance forms part of a detector 12 for detecting current flowing through rectifier 4. The ohmic impedance is shunted by an operational amplifier 14. An output 140 of operational amplifier 14 is connected to output 90 of integration network 9. Consequently, the output of integration network 9 remains proportional to the value of the current through primary winding 21 of inductor 2 whether or not switch 1 is in a conductive or non-conductive state.

The circuit arrangement in addition comprises a capacitance 11 which together with primary winding 21 forms a tuned circuit. When rectifier 4 pass is not conducting and switch 1 is turned off. The voltage thus arising across primary winding 21 induces a voltage in secondary winding 22, forming a voltage source for generating the switch-on signal through voltage divider circuit 10. In an alternative embodiment, a converter portion (not shown) is included between input terminals 5 and switch 1 for converting the voltage of the supply source to a DC voltage suitable for operating the switch 1. The converter portion comprises inter alia a comparatively large capacitor C connected between input terminals 5. The tuned circuit in this case comprises capacitor C and a capacitor 11' connected across the switch 1. Capacitance 11 is not necessary in this embodiment.

The switch-off signal generated in integration network 9 is sent to a control circuit 100, as is the switch-on signal generated in the voltage divider circuit 10. Control circuit 100 provides the actual control necessary for switching switch 1 between its conductive and non-conductive states.

Circuit 8, which includes lamp 7 comprises a commutator circuit (not shown) for producing a current of periodically changing polarity flowing through lamp 7 during lamp operation. Circuitry 8 also typically includes an igniter circuit (not shown) for generating a voltage pulse for igniting lamp 7. Both the commutator circuit and the ingiter circuit will generally form part of the circuit arrangement according to the invention. The commutator can be omitted in cases where the lamp is suitable for DC operation.

In a practical realization of the circuit arrangement described, the latter is suitable for operating a high-pressure metal halide lamp of the UHP type, made by Philips Electronics for connection to a 220 V, 50 Hz supply source. The circuit arrangement is provided with a circuit portion, which is known per se and not shown in the drawing, arranged between the input terminals and switch 1 for converting the AC voltage connected to the input terminals into a DC voltage suitable for operating the switch 1. The converter portion comprises between the input terminals a capacitor C of 47 $\mu$F. A MOSFET, type IRF840 made by International Rectifier, which serves as the switch 1. Inductor 2 is formed by a transformer with a ferrite core, a primary winding of 100 turns and a secondary winding 22 of 30 turns. Capacitor 3 has a capacitance value of 0.82 $\mu$F. Rectifier 4 is formed by a type BYV29F500 diode, made by Philips Electronics. Switch 1 is shunted by capacitor 11' of 560 pF. Ohmic impedance 13 is about 0.15$\Omega$ and operational amplifier 14 is a CA 3140 M96 type. The amplification factor which is set in dependence on the value of ohmic impedance 13, on the dimensions of the components of integration network, 9 and on the winding ratio between primary and secondary winding of the inductive means 2, which is about 100/30.

The practical realization of the circuit arrangement described is highly suitable for use in a projection TV installation.

An alternative possible application is, for example, the operation of a discharge lamp in a motorcar lantern system.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

I claim:

1. A circuit arrangement for igniting and operating a high-pressure discharge lamp, comprising:

a Buck converter including switching means, inductive means and rectifying means for supplying the lamp with a current through periodic switching of the switching means, the inductive means having a primary winding and a secondary winding;

detection means for detecting the flow of current through the rectifying means; and an integration network including the secondary winding of the inductive means and in combination with the detection means for controlling the non-conductive state of the switching means.

2. The circuit arrangement as claimed in claim 1, characterized in that the detection means supplies the integration network with a signal during the period in which the switching means is non-conducting.

3. The circuit arrangement as claimed in claim 1, further including input terminals and output terminals, the detection means being connected between the rectifying means and at least one of the terminals from the group consisting of the input terminals and output terminals.

4. The circuit arrangement as claimed in claim 1, characterized in that the detection means comprises an ohmic impedance.

5. The circuit arrangement as claimed in claim 4, wherein the ohmic impedance is shunted by an operational amplifier having an output connected to an output of the integration network.

6. The circuit arrangement as claimed in claim 2, further including input terminals and output terminals wherein a direct electrical connection is present between one of the input terminals and one of the output terminals, the detection means being connected between the direct electrical connection and the rectifying means.

7. The circuit arrangement as claimed in claim 2, characterized in that the detection means comprises an ohmic impedance.

8. The circuit arrangement as claimed in claim 3, characterized in that the detection means comprises an ohmic impedance.

9. The circuit arrangement as claimed in claim 1, further including a voltage divider for controlling the conductive state of the switching means wherein the secondary winding serves as a voltage source for the voltage divider.

10. The circuit arrangement as claimed in claim 2, further including a voltage divider for controlling the conductive state of the switching means wherein the secondary winding serves as a voltage source for the voltage divider.

11. The circuit arrangement as claimed in claim 3, further including a voltage divider for controlling the conductive state of the switching means wherein the secondary winding serves as a voltage source for the voltage divider.

\* \* \* \* \*